United States Patent
Brenner et al.

(10) Patent No.: US 12,181,976 B2
(45) Date of Patent: Dec. 31, 2024

(54) AUTOMATICALLY DETERMINING OPTIMAL STORAGE MEDIUM BASED ON SOURCE DATA CHARACTERISTICS

(71) Applicant: EMC IP Holding Company LLC, Hopkinton, MA (US)

(72) Inventors: Adam Brenner, Mission Viejo, CA (US); Arun Murti, Mission Viejo, CA (US); Mark D. Malamut, Aliso Viejo, CA (US); Joey C. Lei, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 387 days.

(21) Appl. No.: 17/570,875

(22) Filed: Jan. 7, 2022

(65) Prior Publication Data
US 2022/0188195 A1 Jun. 16, 2022

Related U.S. Application Data

(63) Continuation-in-part of application No. 16/516,154, filed on Jul. 18, 2019, now Pat. No. 11,709,740.

(51) Int. Cl.
| | |
|---|---|
| *G06F 16/00* | (2019.01) |
| *G06F 11/14* | (2006.01) |
| *G06F 16/22* | (2019.01) |
| *G06F 16/28* | (2019.01) |

(52) U.S. Cl.
CPC ...... *G06F 11/1451* (2013.01); *G06F 11/1458* (2013.01); *G06F 16/2246* (2019.01); *G06F 16/285* (2019.01); *G06F 2201/84* (2013.01)

(58) Field of Classification Search
USPC .................................................. 707/652, 692
See application file for complete search history.

(56) References Cited

U.S. PATENT DOCUMENTS

| | | | |
|---|---|---|---|
| 2005/0060356 A1* | 3/2005 | Saika | G06F 11/1464 714/E11.12 |
| 2005/0169172 A1 | 8/2005 | Wang et al. | |
| 2008/0235299 A1 | 9/2008 | Haselton et al. | |
| 2008/0275928 A1 | 11/2008 | Shuster | |
| 2009/0112878 A1 | 4/2009 | Denny et al. | |
| 2009/0132543 A1 | 5/2009 | Chatley et al. | |
| 2010/0070475 A1 | 3/2010 | Chen | |
| 2013/0018946 A1* | 1/2013 | Brown | G06F 11/1451 709/203 |
| 2013/0091458 A1 | 4/2013 | Kang | |
| 2016/0110261 A1* | 4/2016 | Parab | G06F 16/174 707/692 |
| 2018/0121297 A1 | 5/2018 | Swallow et al. | |
| 2019/0045004 A1 | 2/2019 | Khurange et al. | |
| 2020/0019311 A1 | 1/2020 | Zolotow et al. | |

* cited by examiner

*Primary Examiner* — Chelcie L Daye
(74) *Attorney, Agent, or Firm* — Workman Nydegger (57) ABSTRACT

One example method includes defining object groups by classifying each object in a backup saveset based on respective object types of the objects such that all objects in an object group are the same object type, assigning a different respective storage media type to each of the object groups, storing each object group at a respective storage target, representing each object group with a respective Merkle tree that includes a base hash, and mapping each base hash to the storage target where the object group associated with the Merkle tree that includes the base hash is stored.

20 Claims, 7 Drawing Sheets

AUTOMATICALLY DETERMINING OPTIMAL STORAGE MEDIUM BASED ON SOURCE DATA CHARACTERISTICS

FIELD OF THE INVENTION

Embodiments of the present invention generally relate to data backup and restore processes. More particularly, at least some embodiments of the invention relate to systems, hardware, software, computer-readable media, and methods for determining optimal storage media for source data based on characteristics of that source data.

BACKGROUND

Typical backup software does not have the intelligence to automatically classify the types of files in a backup and then assign the correct storage medium to use for storage of those files. In order to do this, a user or customer would have to know what type of data they have in their entire environment, how many copies of each file exist, have deep technical understanding of the each storage medium and, lastly, be vigilant in sorting and classifying their data as it grows over time. Even if the customer knows all this, backup software limits what storage to use on an entire asset basis, rather than on a per file basis. Moreover, and as a practical matter, sorting and classifying data cannot practically or effectively be performed by a human at least because the amount of data involved, and the speed with which it would have to be classified, is simply beyond the capability of a human to handle.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data backup and restore processes. More particularly, at least some embodiments of the invention relate to systems, hardware, software, computer-readable media, and methods for determining optimal storage media for source data based on characteristics of that source data.

In general, example embodiments of the invention operate to, among other things, classify what types of files are being backed up and assign the most efficient storage medium to store those files for data protection use cases. Deduplication, or 'dedupe,' storage targets can be the most cost effective when data is able to be deduplicated relatively efficiently. Examples of such data include, but are not limited to, business documents such as Word and Excel documents, text files, and virtual machine disks (VMDK). On the other hand, because dedupe storage is relatively expensive, non-compressible types of files, such as movies, images, or files that have already been compressed, are more cost effectively stored on less expensive non-dedupe storage, such as object or tape for example, unless there happen to be many copies of the same file or files that contain a high degree of common data.

In more detail then, an underlying concept of at least some embodiments of a the invention is that machines are best suited to perform the high speed, and high volume, work of classifying files and determining what customer data should be stored on a specific storage medium, examples of which include dedupe storage such as the Dell-EMC DataDomain, object storage, or tape drives. These processes can be performed inline as the data is being backed up. As noted earlier, the amount of data companies have makes classifying and choosing the correct storage medium for each file an untenable process for a human but an extremely easy process for machines. While the present disclosure refers to three different storage mediums, embodiments of the invention can be extended beyond those three and to versions of the media with different characteristics. That is, the scope of the invention is not limited to any particular storage types, or groups of storage types.

Embodiments of the invention can be employed in conjunction with backup software that is capable of storing individual files within a single backup on different storage mediums even though, as noted herein, such backup software is not presently capable of determining, on a file basis, which storage should be used for each of the individual files. Instead, known backup software using different storage mediums requires using separate backups for the same asset. That is, it is common for a specific asset, such as a backup or saveset, to have some data that dedupes and compresses efficiently, as well as data that does not dedupe and compress efficiently. For example, an end-user desktop may have both pictures and movies that do not dedupe efficiently, but may also have business documents that do dedupe efficiently. In this example then, two backup processes would have to be performed, one for the data that dedupes and a compresses efficiently, and another backup process for the data that does not dedupe efficiently.

Advantageously then, example embodiments of the invention can, among other things, automatically classify each file that is part of a backup, and then assign the appropriate storage medium, such as dedupe, object or tape for example, for each file. By assigning storage types on a file basis, example embodiments employ dedupe storage only when necessary, thereby reducing customer costs, and can also help to meet customer service level agreements (SLA)s for their data protection use cases. Embodiments of the invention also thus avoid the need for performing multiple backup processes with respect to a given backup or saveset. That is, a single backup process can be performed that automatically classifies and stores all the data in the saveset, notwithstanding that the saveset includes some data which compresses and dedupes efficiently, and other data that does not.

Finally, it is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and IoT Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data generation, data processing, and data management, operations. Such data management operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, can be stored in a data protection environment that may take the form of a public or private cloud storage environment, an on-premises storage environment, and hybrid storage environments that include public and private a elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data can be allocated, and stored, to different respective targets in the storage environment, where the targets each correspond to a data group having one or more particular characteristics.

Example public cloud storage environments in connection with which embodiments of the invention can be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment can take the form of software, physical machines, or virtual machines (VM), or any combination of these, though no particular device implementation or configuration is required for any embodiment. Similarly, data protection system components such as databases, storage servers, storage volumes a (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Figure 1:
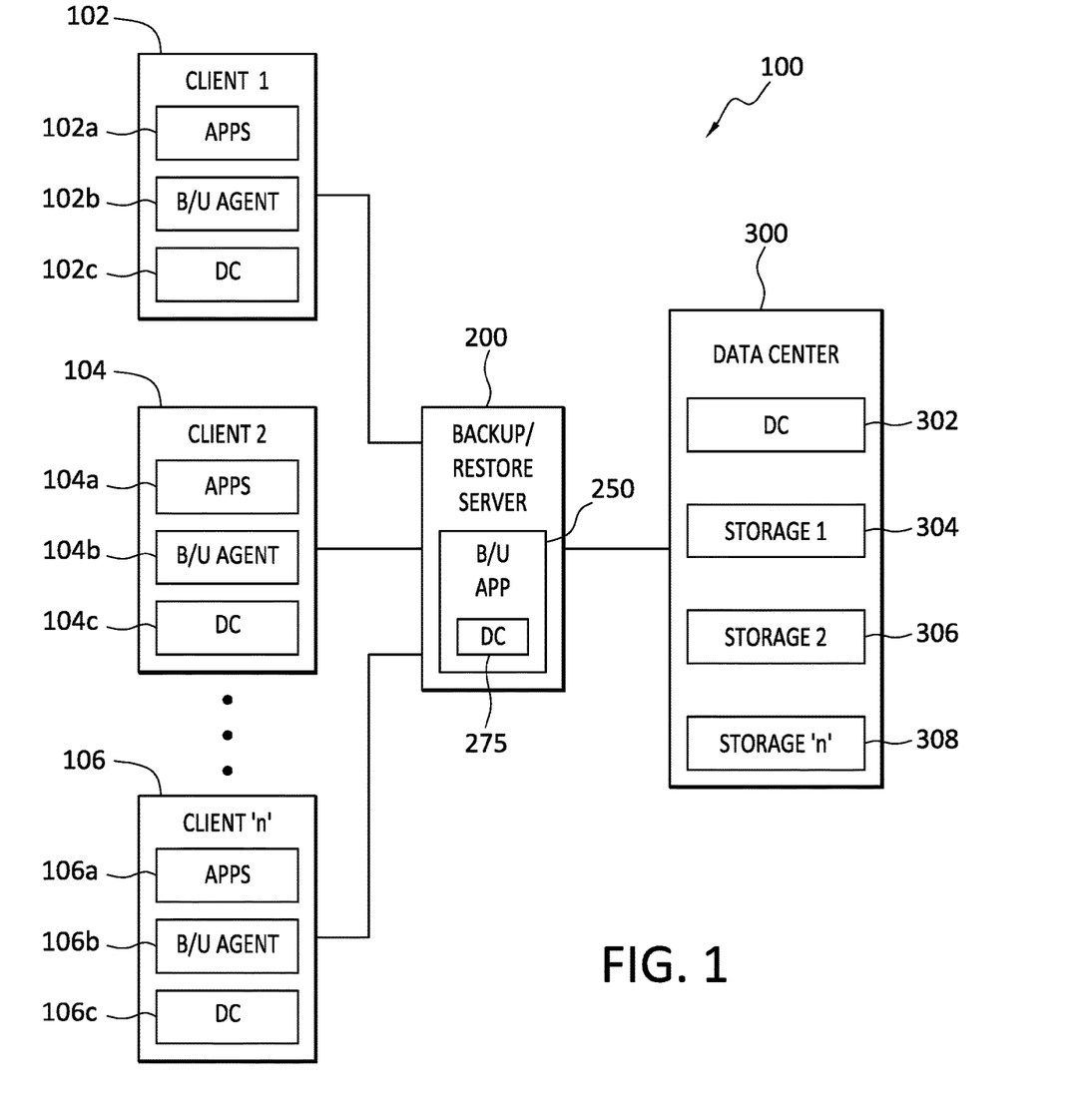
FIG. 1 discloses aspects of an example operating environment for some embodiments of the invention.

With particular attention now to FIG. 1, one example of an operating environment for embodiments of the invention is denoted generally at 100. In general, the operating environment 100 may include any number 'n' of clients such as clients 102, 104, and 106 for example. Each of the clients 102, 104, and 106 may have a respective set of applications 102a, 104a, and 106a, that can generate new and/or a modified data that is later backed up. To that end, the clients 102, 104, and 106 may each include a respective instance of a backup and restore agent 102b, 104b, and 106b. Finally, in some embodiments, the clients 102, 104, and 106 may each include a respective instance of a Data Classifier (DC) 102c, 104c, and 106c. As explained below, one or more instances of a DC may be hosted at other entities.

With continued reference to FIG. 1, the example operating environment 100 may further include one or more backup and restore servers, such as the backup and restore server 200. The example backup and restore server 200 may include an instance of a backup and restore application 250 that cooperates with one or more of the backup and restore agents 102b, 104b, and 106b to create backups of data generated by the client applications 102a, 104a, and 106a. As well, the backup and restore server 200 may also include an instance of a data classifier (DC) 275. In general, and as disclosed elsewhere herein, the DC 275 operates to classify backup data based, for example, on file type and/or other characteristics, so that the various types of backup data are stored in, and restorable from, appropriate respective storage media types and devices.

As further indicated in FIG. 1, the example operating environment 100 may also include a datacenter 300 which can comprise, or include, a cloud storage site that may be a public or private site, or any other type of storage site disclosed herein. The datacenter 300 may, in some embodiments, include an instance of a DC 302. As well, the datacenter 300 may include various different types of storage media 304, 306, and 308, for example. Some example types of storage media 304, 306, and 308 that can be used in various embodiments include, but are not limited to, object storage such as Amazon Web Services (AWS) Simple Storage Service (S3), dedupe storage, and tape.

B. Aspects of an Example Data Classifier and Data Classification

Figure 2:
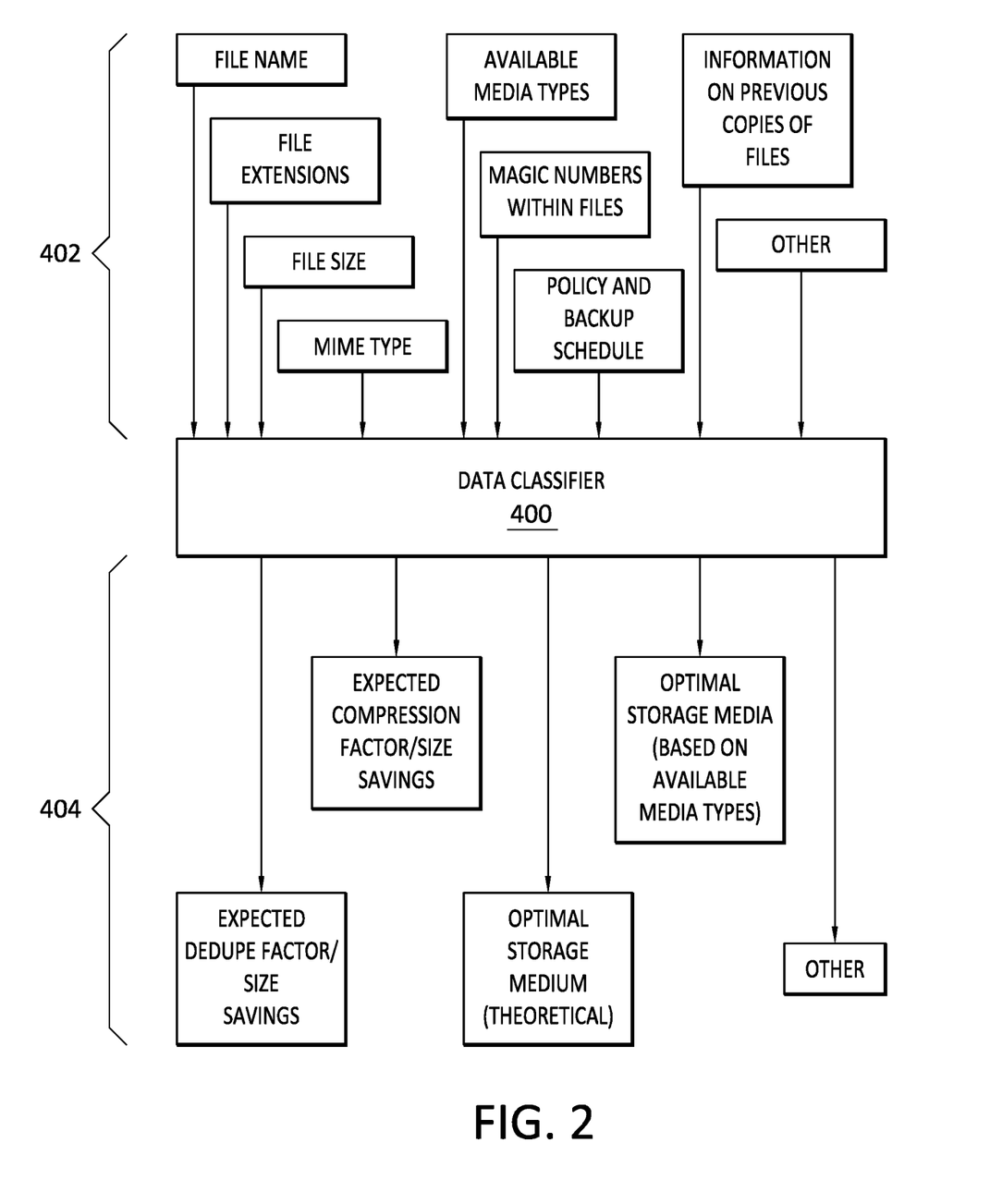
FIG. 2 discloses aspects of an example data classifier (DC).

With reference next to FIG. 2, details are provided regarding example embodiments of a data classifier (DC) and associated functionality. In general, and as disclosed elsewhere herein, the DC functionality can be implemented in a backup application or backup software, although that is not necessarily required, and the DC functionality can additionally, or alternatively, be implemented elsewhere, as noted in the discussion of FIG. 1.

In general, the DC can take into account multiple mediums across multiple storage environments across an entire customer infrastructure. The DC implements this functionality using automation, which is important for customers, as it obviates the need for the customer to attempt to classify and assign storage mediums on their own which, as noted elsewhere herein, is beyond the capability of a human to perform effectively and efficiently. Thus, embodiments of the invention may be effective in resolving problems that did not exist prior to the advent of backup and storage processes and systems.

Among other things, example embodiments of the DC are capable of classifying files in such a way that each file within a single backup may be stored to a different respective storage medium, and each storage medium may be of a different respective type. In some embodiments, the DC can take the form of a library/plugin, making it easily adaptable to work with hardware and software products. The DC can a classify the files of a backup by, for example, examining the backup saveset before streaming and storage, or by classifying the files inline as they are streamed to a storage site such as the datacenter 300 for backup. In any case, the datacenter or other storage site can receive instructions from the DC indicating where, that is, in what type of storage, each file of a backup is to be stored.

As shown in FIG. 2, an example DC 400 can be provided with, or retrieve, a variety of information 402 that the DC 400 can use to make classification determinations and storage decisions. The information 402 can be pushed to, and/or pulled by, the DC 400 at any suitable time, such as before, or during, creation of a backup. To illustrate with an example, during backup time, the backup software, such as backup application 250 for example, can provide the DC 400 with any combination of the following information 402 that can be used by the DC as part of its intelligence: (1) file name; (2) file extensions; (3) file size; (4) magic numbers within a file; (5) multipurpose internet mail extension (MIME) type; (6) information on previous copies of the file; and, (7) policy (including SLA) and backup schedule. The MIME type refers to an internet standard that describes the contents of files based on their nature and format.

Using the information 402, the DC 400 may generate any of a variety of outputs 404 relating to determination of storage media for one or more files of a backup saveset. For example, and as shown in FIG. 2, the example outputs 404 generated by the DC 400 can include any one or more of expected compression factor/size savings, expected dedupe factor/size savings, optimal storage medium (theoretical), optimal a storage media (based on available media types), and various other outputs concerning storage media for individual files. The foregoing are presented only by way of example, and are not intended to limit the scope of the invention in any way.

Thus, the information 402 and/or other information provided to the DC 400 may be used by the DC 400 to: (1) classify each file within a backup; and (2) assign or otherwise associate appropriate storage media to the backup. This mapping of media type(s) to the backup is then provided by the DC 400 to the backup software. It is then the responsibility of the backup software to assign and keep track, after the backup has been performed, of which file is located on which storage medium. This map of files to media type(s) can be stored locally at the backup server and/or elsewhere, and provided to other entities as well, such as one or more clients, and the datacenter where the files will be backed up.

To illustrate, the DC 400 might return, to the backup software, a value of "object storage" for a given file of the backup, and the backup software might interpret that value to mean, for example, AWS S3 Object Storage, or on-prem Dell-EMC Elastic Cloud Storage (ECS). The correlation between a value such as "object storage" and a particular storage medium such as AWS S3 Object Storage can be defined in advance by the DC 400 and/or other entity, or by an administrator. In some embodiments at least, the storage site can provide information to the DC 400 concerning the media type(s) available, or expected to be available, at the storage site at backup time, as well as information concerning the capacity of the available media type(s). The information provided by the storage site can be used by the DC 400 and backup software to identify a storage media for the files in the backup.

In one example, if the DC 400 identifies a file with a file extension of .tar.gz that is unique to the entire operating environment 100, the DC 400 could make the recommendation to store that file on object or tape, rather than on dedupe storage. This recommendation would be made because .tar.gz compressed files do not gain much benefit on dedupe storage, that is, such compressed files are not amenable to signification deduplication, and so there would be little benefit in directing such files to dedupe storage, particularly because dedupe storage tends to be more expensive for the consumer than, for example, non-dedupe storage such as Amazon S3 object storage. Moreover, storing compressed files on dedupe storage may cause an increase in storage and lower the overall efficiency of the entire storage system.

On the other hand, and with continued reference to the aforementioned example .tar.gz file, the DC 400 might also recognize that (i) this particular compressed file is duplicated across an entire environment of the customer, and (ii) each instance is the same. The DC 400 in this case would make a recommendation to store this file on dedupe storage and optionally remove any existing copies in non-dedupe storage while replacing their references to the copy now stored on dedupe storage. Thus, and in contrast with typical systems and software, the DC 400 implements a level of intelligence that enables customers to perform file evaluation and storage on a file by file basis for the entire customer environment.

Note that, as used herein, 'dedupe storage' refers to a storage location where data deduplication is enabled and may be performed. Depending upon the a embodiment, deduplication can be performed inline as data is streamed to storage, by a dedupe server after the backup has been created, or by a backup server. The data can be deduplicated post-process, that is, after storage. As well, data deduplication and/or compression can be performed at the source such as a client for example, or the target where the data is stored, or to be stored.

In another, more complex, example scenario, the DC 400 may notice a movie file which, the DC 400 is aware, historically does not dedupe or compress well, and the DC 400 recommends to store that file, such as an .mpeg, .aiff, or .avi for example, on object storage in a public cloud provider. However due to SLA and cost requirements that were set by the customer, the DC 400 determines that if the customer had to do a restore of this movie file, the restore would be slow and expensive. The restore could be slow if performed over a wide area network (WAN), and may be expensive due to the outgoing bandwidth cost of the public cloud provider. Therefore, the DC 400 might recommend keeping a copy of the file in both dedupe storage and the object storage in the public cloud provider. After some period of time, the DC 400 could make a recommendation to remove the local copy on the dedupe storage. In this example, dedupe storage was chosen because it might be the only storage target available to meet the SLA for fast restores. Thus, while the relative expense of different types of storage can be an important consideration in identifying a target storage media type for a file, it is not necessarily the only consideration.

Yet another example of DC 400 operations concerns devices that include both flash and hard disk drives media. In this example, the customer might back up a .VMDKs which dedupe and compress well, and the DC 400 might, accordingly, generate a recommendation of dedupe storage for the VMDKs. However, due to an SLA set by the customer for fast recovery times, the DC 400 instead might make a recommendation to store the latest backups on flash storage media, while also making a recommendation for older backups to be stored on the hard disk drives. Thus, some considerations may take priority over others when a media type is assigned to a file. These priority relationships can be reflected in a decision tree that can be used by the DC 400 in making media type assignments to files. In some embodiments, the DC 400 might be continuously running and making recommendations to the backup software.

The foregoing examples are not intended to limit the scope of the invention in any way and, rather, are presented to illustrate various disclosed concepts. A wide variety of other scenarios and examples will be readily apparent to one of ordinary skill in the art having the benefit of this disclosure and the knowledge generally available in the art.

With continued reference to FIG. 2, embodiments of the invention are not limited to the example information 402 that the DC 400 can use for its intelligence. Moreover, the DC 400 can, but need not be, implemented as a library/program that is integrated with backup and restore software. Instead, the DC 400 could take the form of a standalone service, implemented as software as a service (SaaS) for example, and hosted on a dedicated server, at a backup server, and/or at a datacenter. Thus, this service could be managed by Dell EMC in a Software-as-a-Service environment, and taking advantage of scalable computing resources which could be located at, and administered by, a cloud storage site. Additionally, where the DC 400 is implemented as a SaaS, further data points such as feedback from customers and cross-customer metadata comparisons can be used to improve the DC's recommendation of where data should be stored. Advanced technology such as machine learning based approaches may be used to provide recommendations using data inputs beyond the illustrative examples identified in FIG. 2.

C. Example Host and Server Configurations

Figure 3:
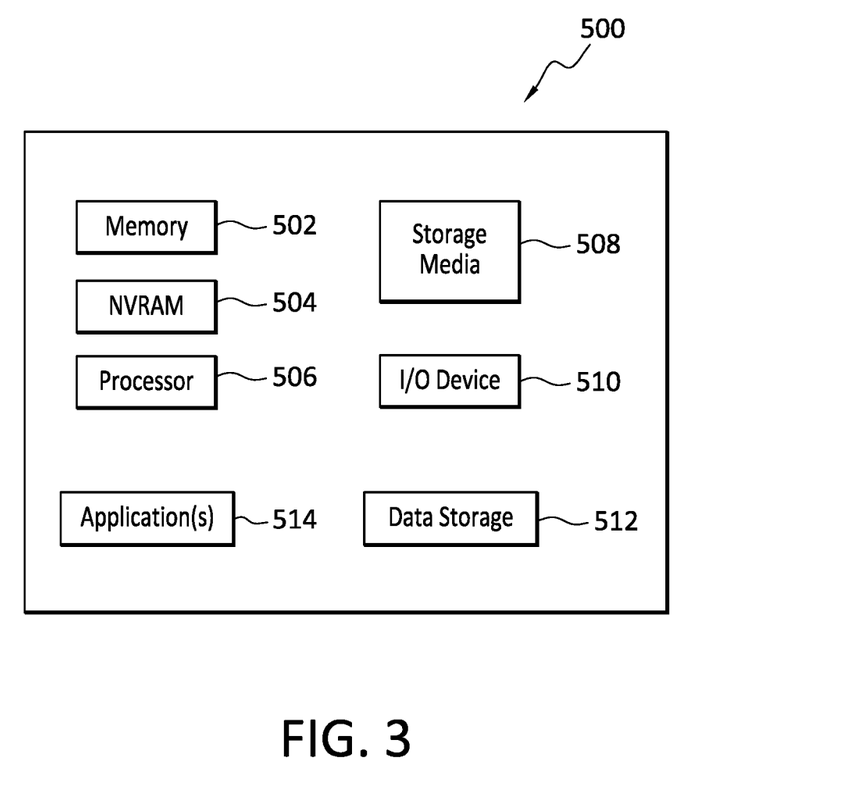
FIG. 3 discloses aspects of an example host configuration.

With reference briefly now to FIG. 3, any one or more of the clients 102, 104, 106, client applications 102*a*, 104*a*, 106*a*, backup and restore agents 102*b*, 104*b*, 106*b*, DC 102*c*, 104*c*, 106*c*, backup/restore server 200, backup application 250, DC 275, datacenter 300, DC 302, storage 302, 304, and 306, and DC 400, can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 3.

In the example of FIG. 3, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions.

Such executable instructions can take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations disclosed herein including, but not limited to, data collection, data processing including data analysis, data read/write/delete operations, instantiation of one or more applications, file classification, and assignment of appropriate storage media to one or more files of a backup.

D. Example Methods

Figure 4:
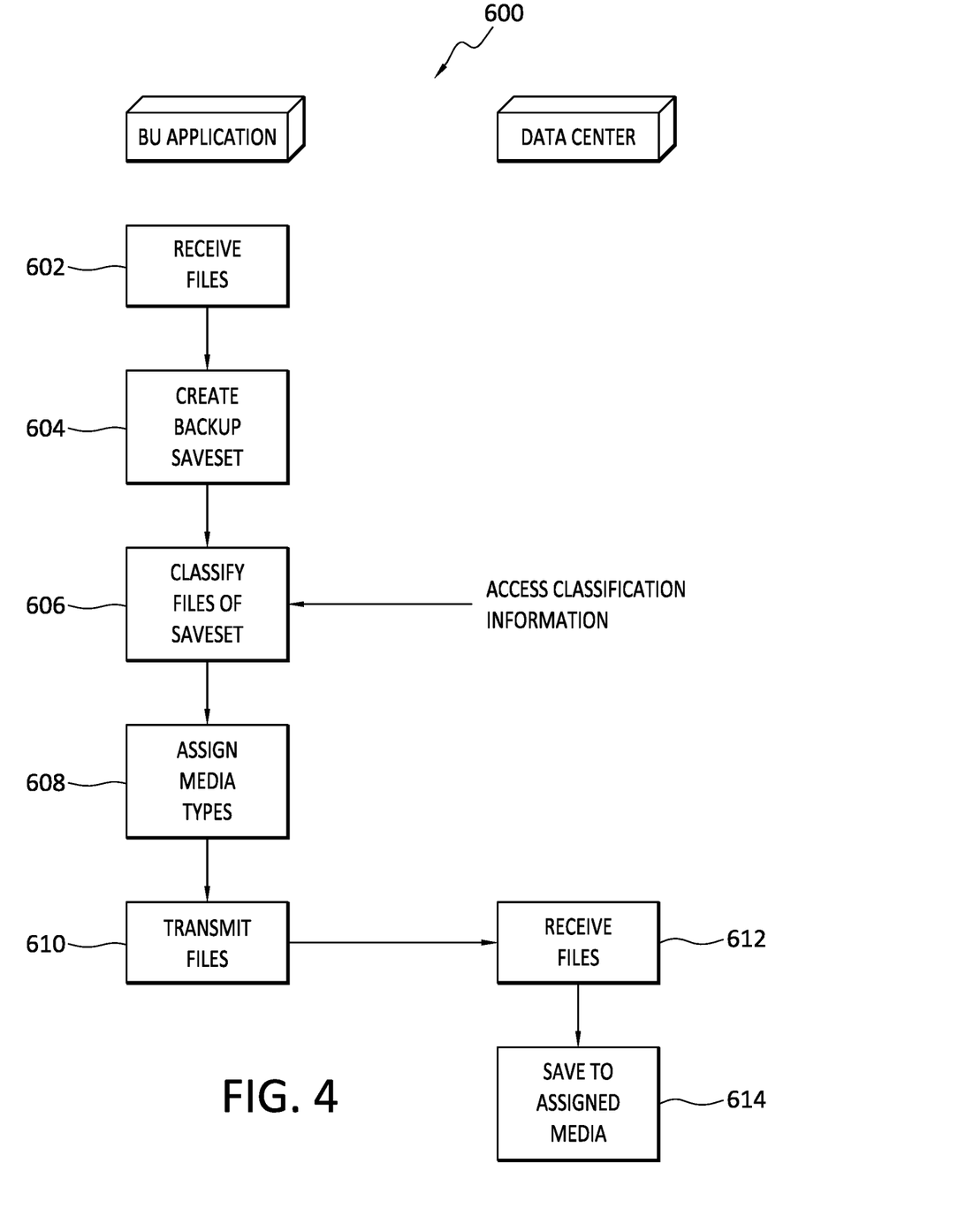
FIG. 4 discloses aspects of an example backup method.

Directing attention now to FIG. 4, aspects of methods for classifying data and assigning storage types based on the data classification are disclosed, where one particular example method is denoted generally at 600. In FIG. 4, various operations are indicated as being performed by particular entities, however, that functional allocation is provided only by way of example, and it should be understood that the functions disclosed herein can be allocated amongst various other entities in various other ways as well. As well, the example of FIG. 4 indicates various operations performed in an order. It should be understood from the present disclosure however, that the operations disclosed herein can be performed in a variety of different orders, and the particular arrangement of FIG. 4 is not limiting of the scope of the invention.

The method 600 can begin when an entity, such as a backup and restore server, receives 602 files for backup. The files may differ from each other in terms of a their compressibility and/or dedupability. There is no limit to the types, numbers, or sizes of files that can be included in a backup saveset. In some embodiments, the files are received 602 from one or more clients, or other entities. After receipt 602 of the files, a backup saveset is then created 604 that includes the files. The backup saveset may be created 604 by cooperation between a backup and restore application of a backup and restore server and a backup and restore agent at a client whose files are, or will be, included in the backup.

Before, during, and/or after, receipt 602 of the files and creation of the backup saveset 604, one or more of the files of the backup saveset are classified 606. Classification 606 may be performed on any of a variety of different bases, one example of which is file type. That is, the classification of a file may simply correspond to the file type of that file. As disclosed herein, example file types include VMDK files, media files, office software files, and email files. As another example, the classification assigned 606 to any particular file may imply a relative compressibility and/or dedupability of that file. For example, a VMDK file may be highly compressible, while a .mpeg file may not be very compressible. In this example, the classification is based explicitly on file type, but also implicitly based on compressibility and dedupability since those characteristics often vary according to file type. As noted in the discussion of FIG. 2, a wide variety of inputs may be considered by the DC in classifying 606 files.

When the files of the backup saveset have been classified 606, a respective media type is assigned 608 to each of the classified files. Thus, the assigned media type(s) are a function of the classification of the file to which the media type(s) are a assigned. For example, dedupe storage may be assigned to a VMDK, which dedupes and compresses well. Various other media types are disclosed elsewhere herein. In some embodiments, a primary media type and secondary media type can be assigned to the same file. The secondary media type may come into play when, for example, the primary media type is not available or lacks adequate capacity. In some embodiments, more than two media types can be assigned to a particular file. A map can be created that indicates each file and the media type assigned to that file. The map can be located, for example, at the backup server, and/or the datacenter.

With continued reference to FIG. 4, once the media type(s) have been assigned 608 to each of the files in the backup saveset, the files, and map if needed, are then transmitted 610 to a storage site, such as a datacenter, for storage. The files of the backup saveset are received 612 at the storage site and then stored 614 according to their respective assigned media type.

Thus, to continue with the VMDK example, a VMDK file in the saveset that has been assigned a dedupe storage media type will be deduped by, and stored in, dedupe storage media at the storage site. As another example, a media file in the saveset that has only limited dedupability and compressibility can be stored in object storage, which may be significantly less expensive, to the backup customer, than dedupe storage. In this way, embodiments of the invention implement a tailored storage approach that can improve cost effectiveness to the customer by only using more expensive storage when necessary, and/or the least expensive storage possible that still meets other customer requirements such as an SLA.

Figure 5:
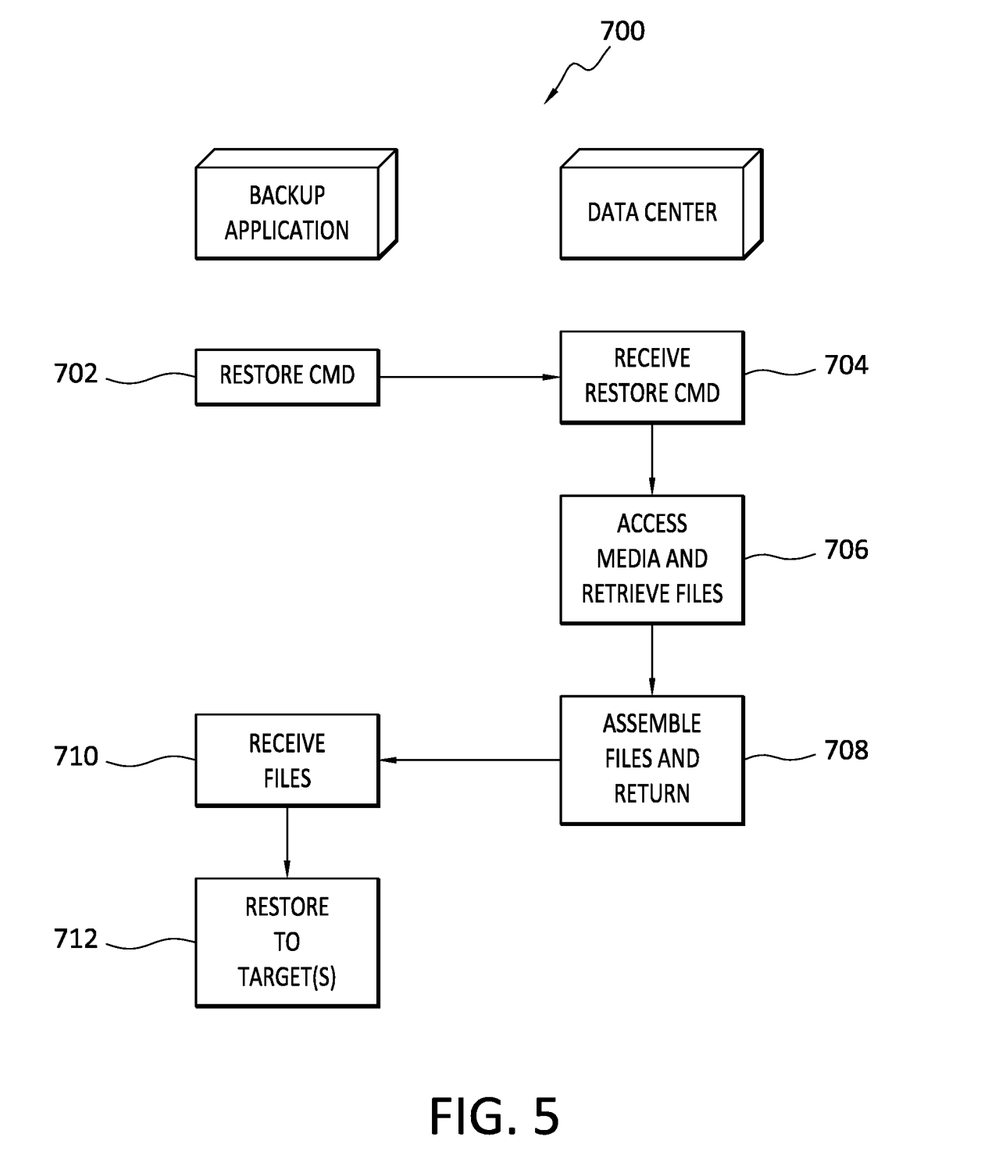
FIG. 5 discloses aspects of an example restore method.

Turning next to FIG. 5, details are provided concerning restore processes involving multiple different storage media, where one example process is denoted generally at 700. The method 700 can begin when a backup and restore application issues a restore command 702 to a storage site, such as a datacenter for example. In some embodiments at least, the restore command can be issued 702 in response to a client request that one or more files at the storage site be restored to the client and/or one or more other target entities. The restore command may identify the files desired to be restored, and may also identify the particular storage media, at the storage site, where each file is stored. Thus, the backup and restore application may track each individual file, and where that file is stored at the storage site, so that this information can be included in the restore request.

The restore request is received 704 at the storage site. The storage site then accesses 706 the various different storage media identified in the storage request, and retrieves, from each storage medium, the file(s) identified in the backup request as being stored in that particular storage medium. After the files have been retrieved 706, they may then be assembled together and returned 708 to the requestor, that is, the backup and restore application.

The backup and restore application receives 710 the files from the storage site, and then restores 712 the received files to the target entity, or entities, that were identified in the initial restore command 702.

Advantageously, the backup 600 and restore 700 processes may appear, to the user or customer, to be the same as or similar to conventional processes, in that a nothing more is required of the user except to specify the files that are to be backed up, or restored, as applicable. That is, the user is neither required to classify the files of the backup, nor to assign storage media to the classified files. Thus, the useful classification and assignment functionality disclosed herein can be implemented without imposing any corresponding burden on the user.

E. Further Example Embodiments

Following are some further example embodiments of the invention. These are presented only by way of example and are not intended to limit the scope of the invention in any way.

Embodiment 1. A method, comprising: receiving a plurality of files, two or more of the files being of different respective file types; creating a backup saveset that includes the plurality of files; classifying each of the files in the backup saveset based in part on the respective file types of the files; assigning a respective storage media type to each of the classified files in the backup saveset; and transmitting the backup saveset to a storage site.

Embodiment 2. The method as recited in embodiment 1, wherein one of the storage media types is different from another of the storage media types.

Embodiment 3. The method as recited in embodiment 1, wherein the method is performed by a backup and restore application.

Embodiment 4. The method as recited in embodiment 1, wherein one of the storage media types is dedupe storage, and another of the storage media types is object storage.

Embodiment 5. The method as recited in embodiment 1, further comprising receiving information and using the information as a basis for classifying the files.

Embodiment 6. The method as recited in embodiment 1, wherein one of the files is relatively more compressible and/or dedupable than another of the files.

Embodiment 7. The method as recited in embodiment 1, wherein one of the storage media types is relatively less expensive for a customer to use than another of the storage media types.

Embodiment 8. The method as recited in embodiment 1, wherein the method is performed automatically by a backup and restore application, without requiring a user or other entity to classify the files, or to assign storage media types to the files.

Embodiment 9. The method as recited in embodiment 1, further comprising tracking the storage media where each of the files is stored at the storage site.

Embodiment 10. The method as recited in embodiment 1, wherein classification of the files is based in part on a customer service level agreement (SLA)

Embodiment 11. A method, comprising: receiving a plurality of objects, two or more of the objects being of different respective object types; creating a backup saveset that includes the plurality of objects; classifying each of the objects in the backup saveset based in part on the respective object types of the objects; assigning a a respective storage media type to each of the classified objects in the backup saveset; transmitting the backup saveset to a storage site; storing the objects in object groups, according to storage media type, at a respective storage target of the storage site; representing each object group with a respective Merkle tree that includes a base hash; and mapping each base hash to the storage target where the object group associated with the Merkle tree that includes the base hash is stored.

Embodiment 12. A method, comprising: defining object groups by classifying each object in a backup saveset based on respective object types of the objects such that all objects in an object group are the same object type; assigning a different respective storage media type to each of the object groups; storing each object group at a respective storage target; representing each object group with a respective Merkle tree that includes a base hash; and mapping each base hash to the storage target where the object group associated with the Merkle tree that includes the base hash is stored.

Embodiment 13. The method as recited in embodiment 12, wherein a Merkle tree is updated automatically when there is a change to an object that is represented in that Merkle tree.

Embodiment 14. The method as recited in any of embodiments 12-13, wherein each of the Merkle trees is represented in a top-level Merkel tree that includes a root hash.

Embodiment 15. The method as recited in embodiment 14, wherein the top-level Merkle tree is updated automatically when there is a change to one of the a Merkle trees.

Embodiment 16. The method as recited in any of embodiments 12-15, wherein the base hashes are mapped to the storage targets within a bitmap of a backup catalog.

Embodiment 17. The method as recited in any of embodiments 12-16, wherein the method is performed automatically by a backup application, without requiring a user or other entity to classify the objects, or to assign storage media types to the objects.

Embodiment 18. The method as recited in any of embodiments 12-17, wherein each node in each Merkle tree is binary-encoded data that represents metadata for one of the objects that is represented in that Merkle tree Embodiment 19. The method as recited in any of embodiments 12-18, wherein each Merkle tree comprises a hash for each object that is represented in that Merkle tree, and each hash is a hash of a combination of: one of the objects, and metadata related to that object.

Embodiment 20. The method as recited in any of embodiments 12-19, wherein the base hash represents all the objects represented in the Merkle tree to which the base hash corresponds.

Embodiment 21. The method as recited in any of embodiments 12-20, wherein a backup application accesses one of the Merkle trees when a change occurs that involves an object represented in that Merkle tree.

Embodiment 22. A method for performing any of the processes, or any a portion thereof, disclosed herein.

Embodiment 23. A non-transitory storage medium having stored therein instructions that are executable by one or more hardware processors to perform the operations of any one or more of embodiments 1 through 22.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of Sa modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

G. Further Developments

Following is a disclosure of further inventions and embodiments that are related to the concepts and inventions that have been disclosed up to this point in this document. In general, and as disclosed hereafter, at least some of the further inventions and embodiments disclosed below are generally concerned with, among other things, the cataloguing of items across multiple storage targets.

G.1 Background

In a data protection system, each time that an asset is backed up, the backup software creates an entry in its catalog. The entry contains, among other information, a reference to the location of the backup data on a storage target. Current backup a software is designed such that all data items within a given backup, such as directories and files for example, are located on a single storage target. In a system such as the one described elsewhere herein, data items may be required to be distributed across more than one storage target. However, conventional backup software is unable to implement such a system and approach.

Thus, example embodiments disclosed herein define and use a backup catalog that allows individual data items to be located on different storage targets. For example, files within a backup may reside on different targets based on one or more characteristics, such as compressibility, or the anticipated need for the data such as hot storage for data that is accessed often or archive storage for data that is accessed less often, for example. This catalog may then be used to implement a system like in which the Data Classifier (DC) evaluates properties of each file, such as extension, size, or MIME Type, for example, to recommend whether that file should be backed up to a different target, that is, a different type of storage, such as dedupe storage, on-premise object storage, or public cloud block storage. Following is a detailed discussion of some example embodiments of the invention.

G.2 Representing Backups as a Set of Merkle Trees

A backup catalog is designed to allow the number of data items to be much larger than the number of storage targets. In data protection environments such as those disclosed herein, there may also be a larger number of storage targets mapped to an instance of backup software, versus the traditional relatively few storage targets. For a example, each backup may consist of millions or billions of data items, stored on tens or hundreds of storage targets. Storing a full path or even a multi-byte identifier for each data item would use much more data than necessary. Further, the performance for backup and/or data movement (replication) would be unacceptable.

While a given backup could be split into individual directories, files, or other groupings, typically there would be sets of files within the backup that share characteristics. For instance, a backup of a laptop may contain documents that are compressible and that can dedupe, but the backup may also contain media files that are not compressible and cannot dedupe. Thus, a one-size-fits-all approach, as is conventionally employed where a backup is stored on one, or only a few, targets, is not well suited for circumstances such as this.

The DC would recommend storing files with the same characteristics on a storage target of the same type. For example, documents would be recommended for storage on a target such as Dell PowerProtect DD, and media files would be recommended for storage on a target such as Dell PowerScale. The backup software would then place documents across one or more storage targets, as per the above recommendations for example. For efficiency, the backup catalog will maintain the fewest number of entries required to map the documents to their storage targets.

To this end, embodiments may employ a Merkle Tree to track the overall structure of the backup. In this approach, each leaf node in the tree is binary-encoded data representing the metadata for an object such as a file for example, where such metadata may comprise, for example, path, size, owner, and other attributes, and the a object content is used to generate a hash. All hashes for the subset of data being stored on a given target are assembled into a Merkle Tree, with the topmost hash being designated as the base hash of the data stored at that target. Thus, there may be a respective Merkle Tree specific to each target that stores a portion of the backup data. Depending upon the amount of data stored at a given target, a base hash for one of the target-specific Merkle Trees could represent anywhere from a single object to billions of objects. All base hashes, that is, one base hash for each target where a portion of the backup is stored, are then aggregated together into a higher-level Merkle Tree, with the topmost hash of the higher-level Merkle Tree being the true root hash of the entire backup.

Figure 6:
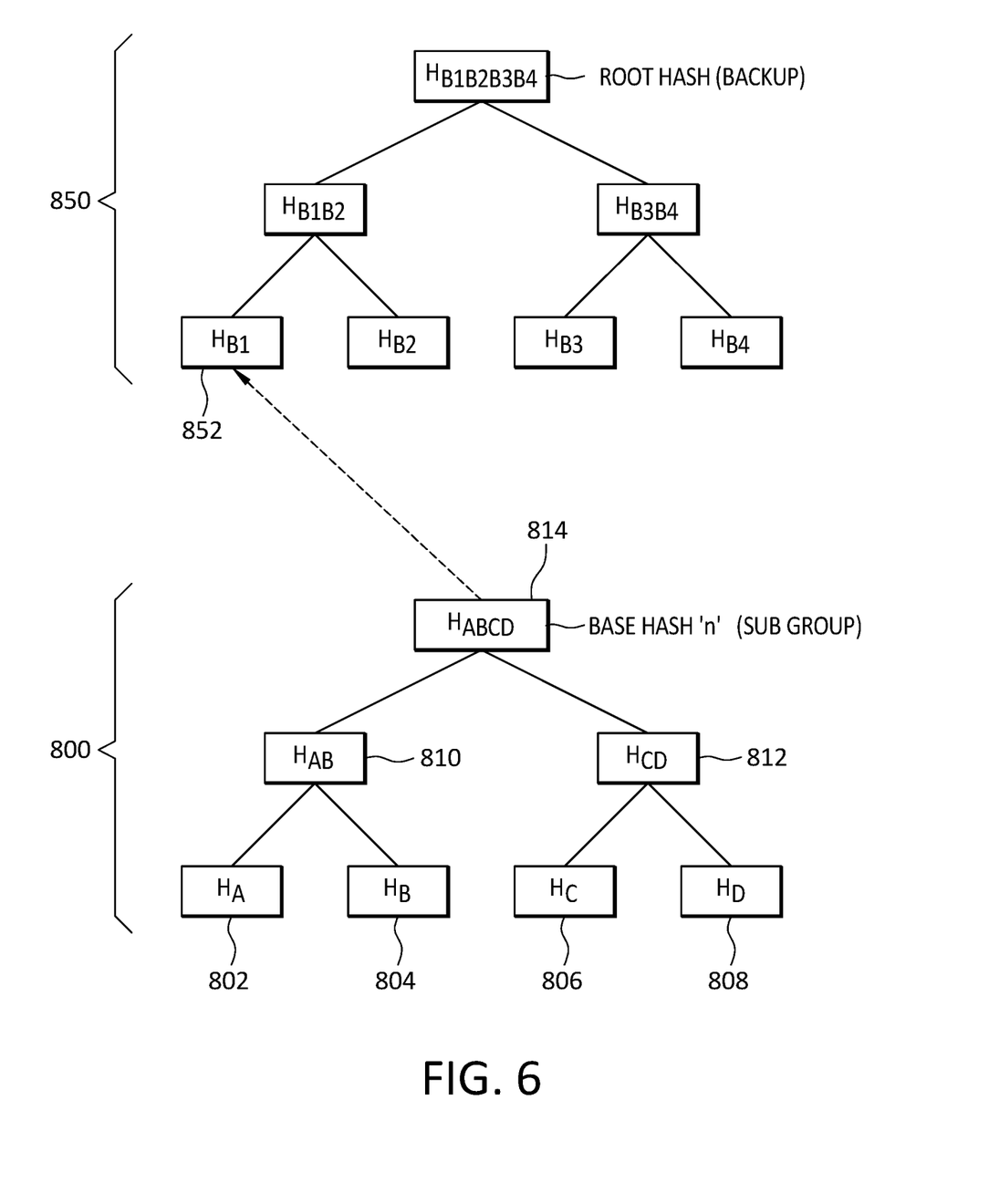
FIG. 6 discloses aspects of an example Merkle tree configuration according to some example embodiments.

With attention now to FIG. 6, an illustrative example of the use of Merkle Trees for storing objects across multiple targets is disclosed. In FIG. 6, a target-specific Merkle Tree 800 is disclosed. As indicated there, each of objects A, B, C, and D, may be represented by a respective hash $H_A$ 802, $H_B$ 804, $H_C$ 806, and $H_D$ 808, of that object and its metadata. At the next level of the Merkle Tree 800, it can be seen that these hashes are then themselves hashed together to generate the hashes $H_{AB}$ 810 and $H_{CD}$ 812. Finally, a base hash $H_{ABCD}$ 814 is generated by hashing the combination of hashes $H_{AB}$ 810 and $H_{CD}$ 812. In this way, the base hash $H_{ABCD}$ 814 represents all the objects that have been stored at a particular target. Because the objects represented by the base hash $H_{ABCD}$ 814 may represent only a sub group of all the objects in a backup, any number 'n' of base hashes may be generated, as dictated by the contents of the backup.

With continued reference to FIG. 6, each of 'n' base hashes, such as the a base hash $H_{ABCD}$ 814, represented as $H_{B1}$ 852 may be inserted into a backup-specific Merkle Tree 850. The various respective base hashes for the sub groups of objects may be hashed together until a root hash $H_{B1B2B3B4}$ is defined that represents the entire backup. Thus, the use of the cascading Merkle Tree structure exemplified in FIG. 6 provides a way to quickly and easily represent an entire backup that is comprised of 'n' different subgroups of objects. Further, the Merkle Tree takes up little memory space and as such is very resource efficient, and can be readily, and automatically, updated when a change occurs to a represented object, or sub group of objects.

With respect to the example of FIG. 6, it is noted that in other embodiments, only one hash operation is used to generate the root hash. In particular, in such embodiments, all the base hashes are hashed together with each other at the same time to produce the root hash, and the intermediate hash steps shown in FIG. 6 may be omitted.

Finally, in another alternative approach, some number of hashes, which could be 10, 100, or any other number, at a given level of a Merkle tree may be combined into a single block of data which may then be hashed to create the higher level. With reference to the example of FIG. 6, this approach could be used to make {HB1,HB2,HB3,HB4} all just feed directly into the single hash HB1B2B3B4. In cases where there happen to be thousands of storage targets, such an implementation would still efficiently store the backup-specific Merkle Tree.

G.3 Internal Data Representation

In example embodiments, the catalog data is stored as a set of tables, within a database such as Postgres. In other embodiments, NoSQL databases like ElasticSearch or other types of databases may be used, based on factors such as, but not limited to, scale, and data access patterns.

Embodiments of the invention may employ a targets table for mapping purposes. As shown in the example Table 1 below, a targets table may hold a mapping between the Target ID, Target Name, and other properties such as, but not limited to, the size of storage, and the type of storage, where example storage types may include dedupe, object, and archive.

TABLE 1

| t_id | t_name | t_type | t_size | t_fqdn | ... |
|---|---|---|---|---|---|
| 0 | DD1 | Dedupe | 1,000,000 | dd1.company.com | ... |
| 1 | PS1 | File | 5,000 | ps1.company.com | ... |

In Table 1, the following example nomenclature is employed: (1) t_id: zero-indexed Target ID; (2) t_name: display name of Target shown to users t_type: type of Target (Dedupe, Object, File, etc.); (3) t size: size of Target in GB; and (4) t_fqdn: fully-qualified domain name of target (used to communicate across network). Additional or alternative fields may be included in other target table configurations.

In addition to a targets table, example embodiments may also employ an asset table, which may be created by a backup application. An asset table may store a mapping between data items and the storage targets on which those data items are located. A bitmap may be used to map each item or groups of items to one or more a storage targets, with the value of the bitmap used as an index into the targets table. Table 2, below, is one example of an asset table that may be used in some example embodiments.

TABLE 2

| a_id | b_id | root_hash | base_hash | t_id_map | ... |
|---|---|---|---|---|---|
| UUID1 | 0 | RH1 | H1 | 0 × 0000 | ... |
| UUID1 | 0 | RH1 | H2 | 0 × 0000 | ... |
| UUID1 | 0 | RH1 | H3 | 0 × 0001 | ... |

In Table 2, the following nomenclature is employed: (1) a_id: asset ID (e.g., a UUID assigned by the backup software); (2) b_id: zero-indexed backup ID (e.g., sequence number); (3) root_hash: top-level Merkle Tree hash for a given backup (a given b_id will always have the same root_hash); (4) base hash: top-level Merkle Tree hash for the subset of the backup stored on a specific storage target; and (5) t_id_map: bitmap used to index into the targets table.

To illustrate with an example concerning Table 1 and Table 2, assuming that there is a 2-byte t_id_map, there can be 256 targets. Each bit in the t_id_map refers to one of the 256 targets (t_id 0 through 255). A larger t_id_map can be used when support for a larger number of targets is required. Use of a bitmap also allows for identical sets of data (dataset) to reside on multiple targets. A root_hash, representing a dataset, or a base_hash, representing a subset of a dataset, can exist on multiple storage targets due to typical data protection use cases such as replication for disaster recovery, and geo-location of data, for example. For example, if t_id_map=0x0005 (binary: 101), then the dataset exists on both t_id 0 and t_id 2. As discussed below, entries in the target table and the asset table may be updated for different data protection operations.

In order to perform various data protection operations, example embodiments may employ various types of file metadata. For example, backup software may need to access metadata for a backup, particularly the Merkle Tree for a subset of data. To illustrate, if a user browses backups or initiates a file-level restore, the backup software must be able to locate the data that is to be restored. The file metadata may be stored as a 'blob' of binary data within the asset table itself, or the file metadata may be stored in a separate key-value store, referenced by the respective base_hash of one or more individual Merkle Trees, and/or by the root_hash of the top-level Merkle Tree, depending on the scale and performance requirements of the overall system.

G.4 Storage Target Operations

Backup software typically implements a set of operations for data mobility or for maintenance. When these operations run, the catalog must be updated accordingly. Following is a discussion of some example operations that may be performed in a data protection environment where example embodiments may be employed.

One example of operations performed by backup software is daily data backups. On each new backup of an asset, if there is a subset of data that has not changed, a new entry may nonetheless be created in the asset table for that subset, but a fields such as the base_hash and t_id_map can have the same entries. However, if a subset of the data does change, such as due to addition, modification, or deletion of files, for example, then a new Merkle Tree, for the affected dataset, with a new base hash is generated and added to the asset table. Put another, this system and approach may not implement a full "incrementals forever" type of backup system, such as is employed in the Dell EMC Avamar platform. When a Merkle tree for an asset is created, deleted, or modified, the top level Merkle tree will accordingly be updated automatically.

Backup software may also perform data replication operations. As used herein, replication of a data, such as backup, refers to the copying of that data from one target to another. Once replication of a backup completes, the system simply needs to set a new bit in the t_id_map is set, corresponding to the t_id in the targets table, for each applicable row in the asset table.

Another example operation that may be performed by backup software is data migration. As used herein, migrating data such as a backup refers to moving that data from one target to another. Once migration of a backup completes, the new bit is set and the old bit is unset in the t_id_map, corresponding to the t_id of the respective entries in the targets table, for each applicable row in the asset table.

Backup software may also be involved where configuration changes, such as hardware and/or software changes, are made to a system, such as by replacing a hardware component for example. To illustrate, a storage system may be replaced due to a hardware refresh, or to recover from a disaster. In both cases, the data on the a original storage target would be copied to the new storage target, either from the original system itself, if the original system is available, or from a replication target that was used for disaster recovery. In either case, the contents of the asset table can remain the same, and only the targets table would need to have the appropriate row updated with the information about the new storage target.

As a final example, backup software may perform a garbage collection (GC) process. When removing expired or deleted backups as part of a backup software GC operation, all rows in the asset table associated with the same b_id are deleted from the catalog. The next level of GC would be performed as usual by the storage target itself. For example, the Dell DD (DataDomain) platform has its own GC for dedupe, to delete segments of data that are no longer referenced by any of the backups.

G.5 Further Discussion

As will be apparent from this disclosure, the example embodiments disclosed herein may provide various useful features and advantages. For example, such embodiments may operate to split backups into sets of objects, such as files for example, that need to be stored on different storage targets. That is, such sets may be defined according to where the objects in a backup need to be stored. As another example, embodiments may operate to group the objects stored on a given storage target, and embodiments may represent the sets of objects using respective Merkle trees, for each set of objects, with a top-level 'base hash.' As well, embodiments may operate to map each base hash to the corresponding storage target, also referred to herein as an asset a or data asset, within a backup catalog in a space-efficient format using bitmaps. Finally, the functionalities of example embodiments may be implemented in connection with a backup catalog that may be stored, for example, at a backup server and/or at a data storage site.

G.6 Aspects of Example Methods

Figure 7:
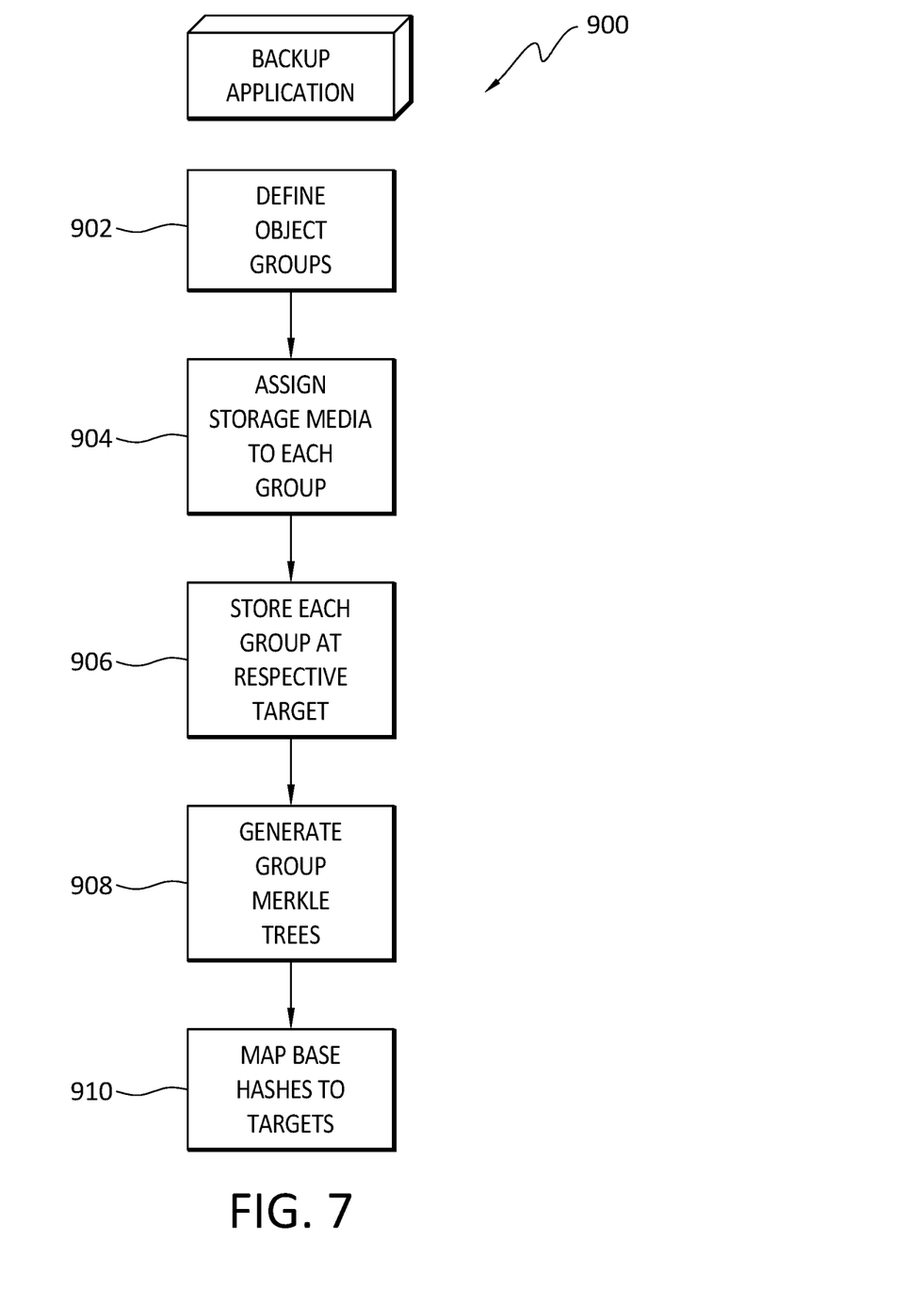
FIG. 7 discloses aspects of an example method for using Merkle trees to a facilitate the storage of backup objects across multiple backup storage targets.

With attention finally to FIG. 7, an example method 900 for using Merkle trees to facilitate the storage of backup objects across multiple backup storage targets is disclosed. Note that while reference is made herein to objects, the scope of the invention is not limited to use with objects. Rather, and more generally, embodiments of the invention may be employed with any data or groupings of data. In some embodiments, part, or all, of the method 900 may be performed by a backup application, or a backup-and-restore application, although neither is necessarily required to perform the method 900.

In the example of FIG. 7, the method 900 may begin by defining one or more object groups 902. Each object group may comprise a subset of objects in a backup saveset, such that the object groups together collectively include all the objects in the backup. The object groups may be defined by classifying each object in a backup saveset based on respective object types of the objects, so that all objects in an object group are the same object type.

After the object groups have been defined 902, a storage media type may be assigned 904 to each of the object groups. The storage media type assigned 904 may be a function of object metadata such as one or more object attributes, an example of a which is the object type. Once the media types have been assigned to the object groups, each of the object groups may be stored 906 at a respective target of the assigned media type.

Before, during, or after, storage 906 of the object groups, a respective Merkle tree may be generated 908 for each of the object groups. The objects in a group are represented as hashes in the Merkle tree that corresponds to that group, and each Merkle tree that is generated 908 includes a base hash.

Finally, each of the base hashes may be mapped 910 to the storage target where the object group represented by that base hash is stored. The base hashes may, in turn, be represented in a higher-level Merkle tree whose root hash represents the entire backup saveset.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
defining object groups by classifying each object in a backup saveset based on compressibility and dedupability of the objects such that all objects in an object group are the same compressibility and dedupability;
assigning a different respective storage media type to each of the object groups;
storing each object group at a respective storage media type, wherein one storage media type for one object group is different from another storage media type for another object group, which is different from the one object group;
hashing each object in a respective object group to generate a base hash;
generating a Merkle tree of the respective object group based on base hashes of every object in the respective object group; and
mapping each base hash of the Merkle tree to a corresponding object of the respective object group associated with the Merkle tree that includes the base hash, wherein the corresponding object is stored in the respective storage media type.

2. The method as recited in claim 1, wherein a Merkle tree is updated automatically when there is a change to an object that is represented in that Merkle tree.

3. The method as recited in claim 1, wherein each of the Merkle trees is represented in a top-level Merkel tree that includes a root hash.

4. The method as recited in claim 3, wherein the top-level Merkle tree is updated automatically when there is a change to one of the Merkle trees.

5. The method as recited in claim 1, wherein the base hashes are mapped to the respective storage media types within a bitmap of a backup catalog.

6. The method as recited in claim 1, wherein the method is performed automatically by a backup application, without requiring a user or other entity to classify the objects, or to assign storage media types to the objects.

7. The method as recited in claim 1, wherein each leaf node in each Merkle tree is binary-encoded data that represents metadata for one of the objects that is represented in that Merkle tree.

8. The method as recited in claim 1, wherein each Merkle tree comprises a hash for each object that is represented in that Merkle tree, and each hash is a hash of a combination of: one of the objects, and metadata related to that object.

9. The method as recited in claim 1, wherein the base hash represents all the objects represented in the Merkle tree to which the base hash corresponds.

10. The method as recited in claim 1, wherein a backup application accesses one of the Merkle trees when a change occurs that involves an object represented in that Merkle tree.

11. A non-transitory storage medium having stored therein instructions that are executable by one or more hardware processors to perform operations comprising:
    defining object groups by classifying each object in a backup saveset based on respective compressibility and dedupability of the objects such that all objects in an object group are the same compressibility and dedupability;
    assigning a different respective storage media type to each of the object groups;
    storing each object group at a respective storage media type, wherein one storage media type for one object group is different from another storage media type for another object group, which is different from the one object group;
    hashing each object in a respective object group to generate a base hash;
    generating a Merkle tree of the respective object group based on base hashes of every object in the respective object group; and
    mapping each base hash of the Merkle tree to a corresponding object of the respective object group associated with the Merkle tree that includes the base hash, wherein the corresponding object is stored in the respective storage media type.

12. The non-transitory storage medium as recited in claim 11, wherein a Merkle tree is updated automatically when there is a change to an object that is represented in that Merkle tree.

13. The non-transitory storage medium as recited in claim 11, wherein each of the Merkle trees is represented in a top-level Merkel tree that includes a root hash.

14. The non-transitory storage medium as recited in claim 13, wherein the top-level Merkle tree is updated automatically when there is a change to one of the Merkle trees.

15. The non-transitory storage medium as recited in claim 11, wherein the base hashes are mapped to the respective storage media types within a bitmap of a backup catalog.

16. The non-transitory storage medium as recited in claim 11, wherein the non-transitory storage medium is performed automatically by a backup application, without requiring a user or other entity to classify the objects, or to assign storage media types to the objects.

17. The non-transitory storage medium as recited in claim 11, wherein each node in each Merkle tree is binary-encoded data that represents metadata for one of the objects that is represented in that Merkle tree.

18. The non-transitory storage medium as recited in claim 11, wherein each Merkle tree comprises a hash for each object that is represented in that Merkle tree, and each hash is a hash of a combination of: one of the objects, and metadata related to that object.

19. The non-transitory storage medium as recited in claim 11, wherein the base hash represents all the objects represented in the Merkle tree to which the base hash corresponds.

20. The non-transitory storage medium as recited in claim 11, wherein a backup application accesses one of the Merkle trees when a change occurs that involves an object represented in that Merkle tree.

* * * * *